United States Patent [19]
Sullivan

[11] Patent Number: 5,387,637
[45] Date of Patent: Feb. 7, 1995

[54] GOLF BALL CORE COMPOSITIONS

[75] Inventor: Michael J. Sullivan, Chicopee, Mass.

[73] Assignee: Lisco, Inc., Tampa, Fla.

[21] Appl. No.: 932,654

[22] Filed: Aug. 20, 1992

[51] Int. Cl.$^6$ ................................................. C08K 3/36
[52] U.S. Cl. ..................................... 524/493; 524/908
[58] Field of Search ................................. 524/493, 908

[56] References Cited

U.S. PATENT DOCUMENTS

| | | | |
|---|---|---|---|
| 3,992,014 | 11/1976 | Retford | 524/908 |
| 4,483,537 | 11/1984 | Hanada et al. | 524/908 |
| 4,561,657 | 12/1985 | Tominaga et al. | 524/908 |
| 4,683,257 | 7/1987 | Kakiuchi et al. | 524/908 |
| 4,838,556 | 6/1989 | Sullivan | 524/908 |
| 4,844,471 | 7/1989 | Terence et al. | 524/908 |
| 4,955,613 | 9/1990 | Gendreau et al. | 524/908 |
| 4,955,966 | 9/1990 | Yuki et al. | 524/908 |
| 5,116,060 | 5/1992 | Sullivan et al. | 524/908 |

*Primary Examiner*—Edward Cain

[57] ABSTRACT

The present invention is directed to improved polybutadiene compositions suitable for molded golf ball core construction. The improved polybutadiene compositions contain specific naturally occurring, essentially non-reinforcing, crystalline (preferably microcrystalline) silica particles which have the effect of increasing the resilience and/or hardness of the resulting molded cores. In addition, the present invention is also directed to golf balls produced utilizing the improved core compositions.

27 Claims, No Drawings

GOLF BALL CORE COMPOSITIONS

BACKGROUND OF THE INVENTION

The present invention is directed to improved polybutadiene compositions suitable for molded golf ball core construction. The improved polybutadiene compositions contain specific naturally occurring, essentially non-reinforcing, crystalline silicas which have the effect of increasing the resilience and/or compression properties of the resultant molded cores. In addition, the present invention is also directed to golf balls produced utilizing the improved core compositions.

Two of the principal properties involved in the performance of golf balls are resilience and hardness. Resilience is determined by the coefficient of restitution (C.O.R.), the constant "e", which is the ratio of the relative velocity of two elastic spheres after direct impact to that before impact, or more generally, the ratio of the outgoing velocity to incoming velocity of a rebounding ball. As a result, the coefficient of restitution (i.e. "e") can vary from zero to one, with one being equivalent to an elastic collision and zero being equivalent to an inelastic collision. Hardness is determined as the deformation (i.e. compression) of the ball under various load conditions applied across the ball's diameter (i.e. the lower the compression value, the harder the material).

Resilience (C.O.R.), along with additional factors such as club head speed, angle of trajectory, and ball configuration (i.e. dimple pattern), generally determines the distance a ball will travel when hit. Since club head speed and the angle of trajectory are not factors easily controllable, particularly by golf ball manufacturers, the factors of concern among manufacturers are the coefficient of restitution (C.O.R.) and the surface configuration of the ball.

In this regard, the coefficient of restitution of a golf ball is generally measured by propelling a ball at a given speed against a hard surface and measuring the ball's incoming and outgoing velocity electronically. The coefficient of restitution must be carefully controlled in all commercial golf balls in order for the ball to be within the specifications regulated by the United States Golfers Association (U.S.G.A.). Along this line, the U.S.G.A. standards indicate that a "regulation" ball cannot have an initial velocity (i.e. the speed off the club) exceeding 255 feet per second (250 feet per second with a 2% tolerance). Since the coefficient of restitution of a ball is related to the ball's initial velocity (i.e. as the C.O.R. of a ball is increased, the ball's initial velocity will also increase), it is highly desirable to produce a ball having a sufficiently high coefficient of restitution to closely approach the U.S.G.A. limit on initial velocity, while having an ample degree of hardness (i.e. impact resistance) to produce enhanced durability.

The coefficient of restitution (C.O.R.) in solid core balls is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings.

With the overall desired properties of golf ball construction in mind, filler and/or reinforcement agents may be added to golf ball core compositions in order to increase the compression of the core and/or to increase the core weight so that the finished ball more closely approaches the U.S.G.A. upper weight limit of 1.620 ounces. The filler and/or reinforcement agents are generally inert particulate matter present in finely divided form, for example, less than about 20 mesh, and preferably less than about 100 mesh U.S. standard screen size. Examples of such inert particles normally utilized in golf ball core construction as reinforcing agents include non-crystalline or amorphous silicas such as fumed, precipitated or hydrated silicas (U.S. Pat. No. 3,756,607), fiberglass (U.S. Pat. No. 3,218,075), graphite (U.S. Pat. No. 4,473,229), sulfates such as barytes and calcium sulfate, zinc oxide, carbon black, titania, alumina fibers, cork, cotton flock, leather fiber, plastic fiber, leather flour, plastic flour, asbestos, talc, and metal oxides and carbonates. However, a number of these filler agents, particularly zinc oxide and titania are expensive and while they effectively add weight to the core, they are relatively ineffective (with the exception of zinc oxide which is effective to some degree at low levels) in enhancing the hardness and resilience of the resulting molded cores.

Along the same line, the Reiter patent (U.S. Pat. No. 4,688,801) demonstrates the use of several fibrous fillers which are also ineffective to some degree for improving resilience. The so-called "active hydrogen containing" fillers disclosed therein (i.e. wood-flock, cotton flock (cellulose-cotton), nylon flock (nylon 6—6), solka-flock (cellulose-wood), cork dust (suberin/cellulose), rayon, etc.) are reported to increase the fracture load and compression (hardness) while also significantly reducing resilience (% rebound). The same patent also demonstrates the effectiveness of inorganic fillers (barytes, zinc oxide, and Franklin Fibers) in decreasing the rebound (i.e. resilience) percentages and, depending on the filler, either increasing or decreasing compression. However, the fact that Reiter did not achieve positive results from the use of many of these fillers including the fumed silicas is attributed to differences in the formulations used, the nature of the filler additives, and/or differences in the compounding/curing methodologies utilized.

The present invention relates to the addition of specific non-amorphorous or crystalline (preferably microcrystalline) silica particles to polybutadiene core compositions in order to produce solid golf ball cores and/or centers exhibiting enhanced resilience and/or compression characteristics. It has been found that the addition of specific naturally occurring crystalline silica particles to the polybutadiene compositions results in an increase of the coefficient of restitution (of from about 0.10% to about 1.00%) over that exhibited by similar cores prepared with a number of inorganic fillers, such as the current standard calcium carbonate fillers.

The findings of the present invention are surprising and unexpected due to the great number of fillers, including reinforcing silicas and/or non-crystalline or amorphous silicas, which produce poorer performance characteristics with respect to resilience (C.O.R.) than the calcium carbonate fillers currently utilized in the trade. As a result, the solid golf ball cores and/or centers of the present invention can be used to produce unitary or wound golf balls approaching the U.S.G.A. initial velocity limit without having to place great reliance on the C.O.R. produced by the specific type of cover and/or windings utilized in the overall construction.

Accordingly, it is an object of the present invention to provide improved polybutadiene core compositions which, when utilized to formulate golf balls, produce golf balls exhibiting enhanced distance and/or durability due to the composition of the core. An additional object of the invention is to provide cores or centers for the construction of solid or wound golf balls which approach the initial velocity limit set by the U.S.G.A. without placing significant emphasis on the coefficient of restitution produced by the balls' cover and/or windings. Furthermore, since a golf ball produced in accordance with the present invention exhibits an enhanced coefficient of restitution and thus, initial velocity, it is possible to increase the durability of the ball by adding additional durability enhancers without greatly sacrificing the ball's overall resilience. A still further object of the invention is to produce golf ball cores or centers which maintain their roundness and shape upon continued impact by a golf club.

The foregoing has outlined some of the most pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a more detailed understanding of the invention may be had by referring to the summary of the invention, the detailed description of the invention and the claims which follow below.

SUMMARY OF THE INVENTION

The present invention is more particularly defined by the appended claims and the detailed description of the invention. However, for the purpose of summarizing the invention, in one aspect, the present invention is directed to an improved composition for golf ball core production comprising a base elastomer selected from polybutadiene and mixtures of polybutadiene with other elastomers, at least one metallic salt of an unsaturated carboxylic acid, a free radical initiator and a naturally occurring crystalline, preferably microcrystalline, silica.

In an additional aspect, the present invention relates to a golf ball comprising a solid core and a cover therefor, the solid core consisting of a base elastomer selected from polybutadiene and mixtures of polybutadiene with other elastomers, at least one metallic salt of an unsaturated carboxylic acid, a free radical initiator and a filler agent comprised of naturally occurring, essentially non-reinforcing, crystalline silica particles having a composition of greater than 95% by weight silicon dioxide ($SiO_2$), and a median particle size from about 2.0 to about 18 microns. The cover comprises of one or more layers of ionomer resin-based compositions.

In a further aspect, the present invention is directed to a process for enhancing the resilience of a golf ball having a core and a cover. The process comprises the addition of specific naturally occurring crystalline silica (preferably the microcrystalline form) particles to a polybutadiene composition utilized to form the core component of the ball. Upon curing of the core composition containing the crystalline silica particles, the cured core is covered with a cover composition. The overall finished golf ball produced by this process exhibits improved durability and/or resilience characteristics.

These and other objects and features of the invention will be apparent from the following description and from the claims.

DETAILED DESCRIPTION OF THE INVENTION

The present invention is directed to new, relatively low-costing core compositions which, when utilized for golf ball core construction, produce cores exhibiting enhanced resilience characteristics (i.e. an improved coefficient of restitution). In this regard, it has been found that the addition of relatively small amounts (i.e. from about 1 to about 30 parts per each 100 parts of rubber (pphr), and preferably from about 6 to about 20 pphr) of specific naturally occurring crystalline and/or microcrystalline silica particles, to polybutadiene core compositions has the effect of increasing the coefficient of restitution of the resulting cores.

More particularly, the present invention is directed to the discovery that specific naturally occurring, essentially non-reinforcing, crystalline silica particles can be added to various polybutadiene core compositions as a cost effective means of lowering compression (i.e. increasing hardness) and raising resilience (i.e. the coefficient of restitution) of the molded cores. In addition, it has also been found that the relatively lower costing naturally occurring crystalline silica particles can be added in substitution for more expensive filler and reinforcement agents utilized in polybutadiene based core production without detracting, and even enhancing, the molded core's overall properties, including the properties of hardness and resilience.

The naturally occurring crystalline silicas suitable for use in the present invention are those which have a silicon dioxide content of greater than 95% and a median particle size from about 1 to about 18 (preferably from about 2 to about 10 and most preferably from about 2.0 to about 6.2) microns. While use of reinforcing silicas, such as fumed or amorphous silicas, in polybutadiene base compositions is known (see U.S. Pat. Nos. 3,218,075 and 3,756,607), these suffer from lower resilience (C.O.R.) and higher costs. The present invention is directed to the use of non-amorphous, non-reinforcing, naturally occurring crystalline (preferably microcrystalline) silicas which produce surprising enhanced resiliency properties when utilized in polybutadiene core compositions at reduced costs.

Along this line, the term "silica" generally denotes the compound silicon dioxide, $SiO_2$, of different grades of purity. This designation includes several crystalline forms of silicon dioxide (i.e. quartz, critobalite, tridymite, keatite, coesite, stishovite, microcrystalline silicas, etc.), as well as various non-crystalline forms (i.e. vitreous silica and a variety of other amorphous types) of the parent compound which may be hydrated or hydroxylated to a greater or lesser degree, such as in the different types of colloidal silicas and silica gels.

When utilized to describe silicas, the term "amorphous" is used herein to denote a lack of a crystal structure, as defined by x-ray diffraction. In turn, the term "crystalline" is used herein to refer to the presence of a crystalline or molecular lattice structure, as delineated by x-ray diffraction.

The non-crystalline, or amorphous silicas, whether naturally (i.e. biogenic silica, opal, diatomaceous earths chert, amorphous silica of volcanic origin, geothermally deposited silica, silicified biogenic materis, etc.) or synthetically produced (i.e. vitreous silica or glass, silica M, microamorphous silica, etc.) can be commercially utilized to improve ink retention on paper, as fillers in paints and coatings, as an abrasive, as fillers and reinforcing materials in rubber and plastics and in electrical insulation. While these materials have proven to be effective filler additions in various polymeric materials including rubber and plastics, they are fairly expensive and have proven to be generally ineffective when used in combination with various polybutadiene compositions to produce molded cores for the production of multi-layered golf balls. This is because the addition of the non-crystalline, or amorphous silicas, produces a substantial reduction in the resulting molded cores coefficient of restitution (C.O.R.) properties. Since a golf ball's C.O.R. value is directly related to the ball's overall travel distance, the addition of the non-crystalline form of silica fillers is ordinarily not desirable.

The present invention is directed to the use of a number of specific naturally occurring, essentially non-reinforcing, crystalline (preferably microcrystalline) silicas. Notwithstanding the adverse properties produced by silicas in general, the inventors have found that specific crystalline silica filler materials produce higher C.O.R. values than a number of other inorganic fillers. As indicated above, this was surprising and unexpected due to the great number of fillers that the inventors have investigated in the past that produced poorer performance (i.e. decreased C.O.R. values) than the current "Verflake" or "Omyacarb 5 ®" fillers or the ground limestone filler currently utilized by Spalding & Evenflo Companies, Inc., the assignee of the present invention.

In this regard, "Omyacarb 5 ®" (formerly "Verflake") is a high calcium limestone product produced by Omya, Inc. of Proctor, Vermont. According to Omya, "Omyacarb 5 ®" is a general purpose extender having the following chemical composition and typical physical properties:

| Chemical Composition: | Percent |
|---|---|
| Calcium Carbonate (CaCO$_3$), | 98.20 |
| Magnesium Carbonate (MgCo$_3$), | 1.20 |
| Silicon Dioxide (SiO$_2$), | <0.25 |
| Other Acid Insoluble, | 0.35 |
| Typical Physical Properties: | |
| Particle Size Range (Sedigraph Method), Microns | Through 25 |
| Mean Particle Size, Microns | 5.0 |
| Residue on 325 mesh (ASTM 185-78), % | <0.01 |
| Fineness of dispersion (Hegman) | 5.0 |
| Mean Refractive Index | 1.59 |
| Dry Brightness (Hunter D-25, Green Filter), % | 95.0 |
| Hardness (Mohs Scale) | 3.0 |
| pH (10% Slurry) | 9.2–9.7 |
| Moisture @ 110° C., % Max. | 0.1 |
| Oil Absorption (ASTM D-281-31), lbs./100 lbs. | 10 |
| Specific Gravity @ 18° C. | 2.71 |
| Bulk Value: | |
| One pound bulks (Gals.) | 0.044 |
| Wt. per solid Ga. (lbs.) | 22.57 |
| Apparent Dry Bulk Density: | |
| Loose (lbs./ft.$^3$) | 48 |
| Compacted (lbs./ft.$^3$) | 80 |

Although "Oxyacarb 5 ®" has proven to be an effective filler agent in polybutadiene compositions for golf ball core construction, it has been discovered that the natural occurring, crystalline silicas produce even better results at similar or less costs. These crystalline fillers have a silicon dioxide content of greater than 95 weight percent and a particle size distribution range of from about 1.0 to about 18 microns, preferably about 2 to about 10 microns, and most preferably from about 2.0 to about 6.2 microns.

The preferred silica particles are the natural, high purity, non-reinforcing, microcrystalline silica particles, such as those sold by the Unimin Specialty Minerals Company of Elco, Ill. under the tradename "Imsil" or "Tamsil". In particular, those having a median particle size of about 2.1 microns (i.e. "Imsil A-8") are the most preferred. The chemical composition and typical physical properties of "Imsil A-8" are as follows:

| Chemical Composition: | Percent |
|---|---|
| Silicon dioxide (SiO$_2$) | 99.0 |
| Iron oxide (Fe$_2$O$_3$) | 0.058 |
| Aluminum oxide (Al$_2$O$_3$) | 0.448 |
| Calcium oxide (CaO) | 0.023 |
| Magnesium oxide (MgO) | 0.016 |
| Titanium dioxide (TiO$_2$) | 0.020 |
| Potassium oxide (K$_2$O) | 0.055 |
| Sodium oxide (Na$_2$O) | 0.010 |
| Loss on Ignition (L.O.I.) | 0.436 |
| Typical Physical Properties: | |
| pH | 6.4 |
| Oil Absorption[1], g/100 g | 28.0 |
| Hegman | 7.0 |
| 325 Mesh Sieve, % passing | 100.0 |
| Median Particle Size[2], microns | 2.1 |
| Surface Area[3], m/g | 2.0 |
| G.E. Brightness[4] | 87.7 |
| L* | 95.7 |
| A* | +0.12 |
| B* | 2.20 |
| Moisture, % | 0.2 |

[1]ASTM D-1438
[2]Sedigraph
[3]Fisher Sub-Sieve
[4]Macbeth Color Eye 1500/Plus Spectrophotometer Examples of other grades of microcrystalline silicas which have proven to be particularly beneficial in the present invention include, but are not limited to, those sold by Unimin Specialty Minerals, Inc. under the designation "Imsil A-75" and "Tamsil 150". The chemical compositions and typical physical properties of these microcrystalline silicas are as follows:

| A. "Imsil A-75" | |
|---|---|
| Chemical Composition: | Percent |
| Silicon dioxide (SiO$_2$) | 99.0 |
| Iron oxide (Fe$_2$O$_3$) | 0.056 |
| Aluminum oxide (Al$_2$O$_3$) | 0.434 |
| Calcium oxide (CaO) | 0.021 |
| Magnesium oxide (MgO) | 0.014 |
| Titanium dioxide (TiO$_2$) | 0.023 |
| Potassium oxide (K$_2$O) | 0.054 |
| Sodium oxide (Na$_2$O) | 0.009 |
| Loss on Ignition (L.O.I.) | 0.390 |

PARTICLE SIZE ANALYSIS & PROPERTIES OF IMSIL A-75
Sieve Analysis

| Mesh | % Passing |
|---|---|
| 50 | 100.00 |
| 70 | 99.99 |
| 100 | 99.89 |
| 140 | 99.39 |
| 200 | 97.79 |
| 270 | 96.15 |
| 325 | 95.00 |

| Typical Physical Properties: | |
|---|---|
| pH | 6.5 |
| Oil Absorption[1], g/100 g | 27.0 |
| Hegman | N/A |
| 325 Mesh Sieve, % passing | 95.0 |
| Median Particle Size[2], microns | 6.2 |

-continued

| | |
|---|---|
| Surface Area[3], m/g | 1.3 |
| G.E. Brightness | N/A |
| L* | 95.7 |
| A* | N/A |
| B* | N/A |
| Moisture, % | 0.17 |

[1]ASTM D-1438
[2]Sedigraph
[3]Fisher Sub-Sieve
[4]Macbeth Color Eye 1500/Plus Spectrophotometer B. "Tamsil 150"

| Chemical Composition: | Percent |
|---|---|
| Silicon dioxide ($SiO_2$) | 99.166 |
| Iron oxide ($Fe_2O_3$) | 0.106 |
| Aluminum oxide ($Al_2O_3$) | 0.298 |
| Calcium oxide (CaO) | 0.021 |
| Magnesium oxide (MgO) | 0.015 |
| Titanium dioxide ($TiO_2$) | 0.021 |
| Sodium ($Na_2O$) % | 0.007 |
| Potassium ($K_2O$) % | 0.040 |
| Loss on Ignition (L.O.I.) % | 0.325 |

PARTICLE SIZE ANALYSIS & PROPERTIES OF TAMSIL 150
Sieve Analysis

| Mesh | % Passing |
|---|---|
| 50 | 100.00 |
| 70 | 99.99 |
| 100 | 98.89 |
| 140 | 96.29 |
| 200 | 91.19 |
| 270 | 83.99 |
| 325 | 79.89 |

Typical Physical Properties:

| | |
|---|---|
| pH | 5.9 |
| Oil Absorption[1], g/100 g | 32.0 |
| Hegman | N/A |
| 325 Mesh Sieve, % passing | 79.9 |
| Median Particle Size[2], microns | 15.2 |

-continued

| | |
|---|---|
| Surface Area[3], m/g | 0.7 |
| G.E. Brightness[4] | N/A |
| L* | 95.7 |
| A* | N/A |
| B* | N/A |
| Moisture, % | 0.13 |

[1]ASTM D-1438
[2]Sedigraph
[3]Fisher Sub-Sieve
[4]Macbeth Color Eye 1500/Plus Spectrophotometer According to Unimin, the "Imsil" and "Tamsil" products are mined from high purity white microcrystalline tripoli deposits which were laid over 400–450 million years ago as silica-enriched limestone. Leaching of the limestone deposits over the years has concentrated the precipitate silica in pure white deposits. These particles are generally "plate-like" in structure and, are smaller in size and have less surface area than comparable crystalline silica particles. Furthermore, in comparison to crystalline silicas, the microcrystalline silica particles take less energy to produce.

In addition to the highly preferred microcrystalline products, a number of crystalline silicas have been found to produce fairly effective results with respect to improving the C.O.R. values of polybutadiene core compositions. For example, effective crystalline silica particles having a silica dioxide content greater than 95 weight percent include "Silcosil #75" sold by Smith Chemical & Color Co. of Jamaica, N. Y., "U.S. Silica #200" sold by U.S. Silica Company of Berkeley Springs, W. Va., and "201 Silica" sold by Whittaker, Clark and Daniels, Inc. of South Plainfield, N.J. The chemical compositions and typical properties of these crystalline silicas are listed below:

| | A. Silcosil 75 | | | | |
|---|---|---|---|---|---|
| Mine | 200 Mesh Mapleton Depot, PA | 200 Mesh Pacific, MO | 200 Mesh Columbia, SC | 200 Mesh Mill Creek OK | 200 Mesh Berkeley Springs, WV |
| Sieve Analysis[1] | | | | | |
| Cum. ⅛ + 100 Mesh | 0.1 | Trace | Trace | Trace | 0.1 |
| Cum. ⅛ + 200 Mesh | 1.8 | 1.6 | 1.5 | 1.6 | 0.7 |
| Cum. ⅛ + 325 Mesh | 12.0 | 12.0 | 13.0 | 13.0 | 12.0 |
| Particle Size | | | | | |
| Median (Microns)[2] | 18.0 | 17.0 | 16.0 | 15.0 | 16.0 |
| Average (Microns)[2,4] | 6.7 | 6.0 | 6.0 | 6.0 | 6.0 |
| Specific Surface[3] Area, (cm³/g) | 3400 | 3800 | 3800 | 3800 | 3800 |
| Oil Absorption,[4] (lbs./100 lbs) | 23.0 | 20.5 | 22.0 | 20.0 | 24.0 |
| Hegman Grind[5] | 1 | 1 | 1 | 1 | 1 |
| Apparent Density,[6] (lbs/cu.ft.) | | | | | |
| Bulk Density, Tapped | 94 | 93 | 94 | 93 | 94 |
| Bulk Density, Untapped | 56 | 55 | 57 | 55 | 58 |
| Optical Properties[7] | | | | | |
| Reflectance, Green Tris | 84.0 | 88.0 | 86.0 | 88.0 | 85.0 |
| Reflectance, Blue Tris | 81.0 | 85.0 | 82.0 | 87.0 | 82.5 |
| Reflectance, Amber Tris | 85.0 | 89.0 | 87.5 | 90.0 | 88.0 |
| Yellowness | 0.60 | .047 | .055 | .035 | .060 |
| Brightness (457 μm)[8] | 82.0 | 86.0 | 84.0 | 86.0 | 84.0 |
| pH[9] | 6.8 | 7.2 | 6.0 | 7.0 | 6.8 |
| Chemical Analysis %[10] | | | | | |
| $SiO_2$ | 99.6 | 99.7 | 99.5 | 99.7 | 99.6 |

-continued

| Mine | A. Silcosil 75 | | | | |
|---|---|---|---|---|---|
| | 200 Mesh Mapleton Depot, PA | 200 Mesh Pacific, MO | 200 Mesh Columbia, SC | 200 Mesh Mill Creek OK | 200 Mesh Berkeley Springs, WV |
| $Fe_2O_3$ | .035 | .018 | .025 | .020 | .025 |
| $Al_2O_2$ | .110 | .100 | .200 | .090 | .100 |
| $TO_2$ | .023 | .012 | .035 | .012 | .020 |
| CaO | .015 | .01 | <.01 | .035 | .015 |
| MgO | <.01 | <.01 | <.01 | <.01 | <.01 |
| LO.I | .200 | .145 | .150 | .140 | .200 |

[1] ASTM C-371-56
[2] SEDIGRAPH 50% Point ASTM C-958
[2A] Fisher Subsieve ASTM B-330
[3] Derived from Fisher avg. particle size (see above)
[4] ASTM D-1483
[5] ASTM D-1210
[6] U.S. Silica
[7] HunterLab Colorimeter ASTM E-306
[8] Photovolt
[9] 5% Slurry
[10] ASTMC-146-72

| B. U.S. SILICA #200 | |
|---|---|
| TYPICAL SIZE ANALYSIS | |
| U.S. Sieve No. | % Passing |
| 70 | 100.00 |
| 100 | 99.4 |
| 140 | 95.4 |
| 200 | 80.4 |
| 270 | 53.4 |
| 325 | 44.4 |
| Pan | 0.0 |

| TYPICAL PHYSICAL ANALYSIS: | |
|---|---|
| Mineral | Quartz |
| Water Absorption (lbs./100 lbs.) | 25.8 |
| Oil Absorption (lbs./100 lbs.) ASTM D-1483 | 20.5 |
| Bulk Density (lbs./ft.$^3$) | |
| Compacted | 92.0 |
| Uncompacted | 52.3 |
| Average Particle Size (Diameter in microns) | 23.3 |
| Specific Surface Area (cm$^2$/gm) | 1382 |
| pH | 5.3 |
| G.E. Brightness | 70.5 |
| Reflectance | |
| Dry, Green | 72.0 |
| Paste, Green | 53.5 |
| Slurry, Green | 47.0 |
| Blue | 45.5 |
| Amber | 48.5 |
| Yellowness index | .064 |
| Moisture Content Dry (Max.) | .5% |
| Specific Gravity | 2.57 |
| Hardness (Moh) | 7.0 |
| Melting Point | 3100° F. |
| Color | White |

| TYPICAL CHEMICAL ANALYSIS: | |
|---|---|
| (Percent reported as oxide) | |
| | Percent |
| $SiO_2$ (Silicon Dioxide) | 96.17 |
| $Fe_2O_3$ (Iron Oxide) | .25 |
| $TiO_2$ (Titanium Dioxide) | .03 |
| $Al_2O_3$ (Aluminum Oxide) | 2.92 |
| CaO (Calcium Oxide) | .02 |

| C. 201 Silica | | |
|---|---|---|
| | | Percent |
| Typical Chemical Analysis: | | |
| Silica | $SiO_2$ | 99.0 (+/−0.5) |
| Aluminum Oxide | $Al_2O_3$ | 0.18 |
| Calcium Oxide | CaO | 0.04 |
| Ferric Oxide | $Fe_2O_3$ | 0.02 |
| Magnesium Oxide | MgO | 0.01 |

-continued

| | |
|---|---|
| Undetermined | 0.08 |
| Water Solubles | 0.04 |
| Moisture | 0.25–0.50 |
| Loss on Ignition | 0.19 |
| pH | 6.70 |
| Typical Physical Properties: | |
| Color | White |
| Specific Gravity | 2.65 |
| Refractive Index | 1.54 |
| Hardness | 6.50 |
| Melting Point, deg. C. | 1700 |
| Weight per Gallon, lbs. | 22.05 |
| One pound Bulks in Gallons | 0.04536 |
| Oil Absorption | 26–28 |
| Thru 200 Mesh, % | 92–95 |

As briefly mentioned above, the crystalline particles are generally larger in size, have larger surface area and take more energy to produce than the microcrystalline particles. Moreover, the crystalline silica particles are generally ground up to produce the desired particle size, while the microcrystalline particles are usually produced from agglomerated particles.

However, notwithstanding the above-indicated differences in the crystalline and microcrystalline silica particles, they have recently been shown to produce enhanced C.O.R. properties in golf ball core construction. In view of the relative ineffectiveness demonstrated by Reiter and others concerning the incorporation of various types of inorganic fillers, including fused or amorphorous silicas, into core compositions due to the specific nature of the fillers, the compositions and/or the compounding methodologies utilized, the incorporation of the crystalline (preferably microcrystalline) into core compositions to improve the resilience and the hardness (i.e. compression) properties of core compositions would not have been expected. From the information known in the prior art, it is clear that an increase in C.O.R. values from the use of specific silica particles is unexpected and therefore not obvious to one skilled in the art.

The core compositions and resulting molded golf balls of the present invention are manufactured using essentially conventional ingredients and techniques. In this regard, the core compositions of the invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed.

The unsaturated carboxylic acid component of the core composition is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof. Preferably, the acid component is either acrylic or methacrylic acid. Usually, from about 20 to about 50, and preferably from about 25 to about 35 parts by weight of the carboxylic acid salt is included in the core composition.

The free radical initiator included in the core composition is any known polymerization initiator which decomposes during the cure cycle. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of rubber (pphr).

Exemplary of suitable peroxides for the purposes or the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof.

The core compositions of the present invention may additionally contain any other suitable and compatible modifying ingredients including, but not limited to, metal oxides, fatty acids, and diisocyanates.

Moreover, notwithstanding the particular incorporation of the naturally occurring, non-reinforcing crystalline (preferably microcrystalline) silicas indicated above, additional filler-reinforcement agents may also be added to the composition of the present invention. As fillers, any known and conventional filler-reinforcement material, such as those set forth above, or mixtures thereof, may be used. Such fillers as are incorporated into the core compositions should be in finely divided form, as for example, in a size generally less than about 30 mesh and preferably less than about 100 mesh U.S. standard size. Particularly useful is the oxide or carbonate of the cation used in forming the metal salt of the unsaturated carboxylic acid component. The amount of additional filler included in the core composition is primarily dictated by weight restrictions and preferably is included in amounts of from about 0 to about 100 parts by weight per 100 parts rubber.

Fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. When included in the core compositions, the fatty acid component is present in amounts of from about 1 to about 15, preferably in amounts from about 2 to about 5 parts by weight based on 100 parts rubber.

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates know to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above identified patents, which are incorporated herein by reference.

The golf ball core compositions of the invention are generally comprised of the addition of about 1 to about 30 (preferably about 6 to about 20) parts by weight of specific naturally occurring, essentially non-reinforcing, crystalline (preferably microcrystalline) silicas to core compositions comprised of 100 parts by weight of a base elastomer selected from polybutadiene and mixtures of polybutadiene with other elastomers, 20 to 50 parts by weight of at least one metallic salt of an unsaturated carboxylic acid, and 1 to 10 parts by weight of a free radical initiator. More preferably, the specific naturally occurring, essentially non-reinforcing, crystalline silicas utilized in the present invention have a silicon dioxide content of greater than 95%, and a medium particle size from about 2.0 to about 18 (preferably from about 2.0 to about 10, and most preferably from about 2.0 to about 6.2) microns. The ratios of the ingredients may vary and are best optimized empirically.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, specific crystalline (preferably microcrystalline) silica particles, (if desired), zinc salt, metal oxide, fatty acid, and the metallic dithiocarbamate (if desired), surfactant (if desired), and tin difatty acid (if desired), are blended for about 7 minutes in an internal mixer such as a Banbury mixer. As a result of shear during mixing, the temperature rises to about 200° F.

The initiator and diisocyanate are then added and the mixing continued until the temperature reaches about 220° F. whereupon the batch is discharged onto a two roll mill, mixed for about one minute and sheeted out.

The mixing is desirably conducted in such a manner that the composition does not reach incipient polymerization temperatures during the blending of the various components. The sheet is then placed in a Barwell preformer and slugs are produced. The slugs are next subjected to molding.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and cooled at room temperature for about 4 hours. The surface of the cores are preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel. In addition, the molded cores may also be subjected to a centerless grinding operation whereby a thin layer of the molded core is removed to produce a round core having a diameter, preferably of about 1.545 inches.

The core is converted into a golf ball by providing at least one layer of covering material thereon, ranging in thickness from about 0.050 to about 0.250 inches and preferably from about 0.060 to about 0.090 inches. The cover composition preferably is made from ethylene-acrylic acid or ethylene-methacrylic acid copolymers neutralized with mono or polyvalent metals such as sodium, potassium, lithium, calcium, zinc, or magnesium.

The ionic copolymers used to produce the cover compositions may be made according to known procedures, such as those in U.S. Pat. No. 3,421,766 or British Patent No. 963,380, with neutralization effected according to procedures disclosed in Canadian Patent No. 674,595 and 713,631, wherein the ionomer is produced by copolymerizing the olefin and carboxylic acid to produce a copolymer having the acid units randomly distributed along the polymer chain. The ionic copolymer comprises one or more α-olefins and from about 9 to about 15 weight percent of α, β-ethylenically unsaturated mono- or dicarboxylic acid, the basic copolymer neutralized with metal ions to the extent desired.

At least 18% of the carboxylic acid groups of the copolymer are neutralized by the metal ions, such as sodium, potassium, zinc, calcium, magnesium, and the like, and exist in the ionic state.

Suitable olefins for use in preparing the ionomeric resins include, but are not limited to, ethylene, propylene, butene-1, hexene-1, and the like. Unsaturated carboxylic acids include, but are not limited to, acrylic, methacrylic, ethacrylic, α-chloroacrylic, crotonic, maleic, fumaric, itaconic acids, and the like. Preferably, the ionomeric resin is a copolymer of ethylene with acrylic and/or methacrylic acid.

The covered golf ball can be formed in any one of the several methods known to the art. For example, the molded core may be placed in the center of a golf ball mold and the ionomeric resin-containing cover composition injected into and retained in the space for a period of time at a mold temperature of from about 40° F. to about 120° F.

Alternatively, the cover composition may be injection molded at about 300° F. to about 450° F. into smooth-surfaced hemispherical shells, a core and two such shells placed in a dimpled golf ball mold and unified at temperatures on the order of from about 100° F. to about 200° F.

The golf ball produced is then painted and marked, painting being effected by spraying techniques.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

By blending the ingredients tabled below, golf ball cores having finished diameters of about 1.545 inches were produced by compression molding and subsequent removal of a surface layer by grinding. Each core was formulated using 500 parts high cis content polybutadiene. In the formulations, the amounts of the remaining ingredients and the weight, degree of coefficient of restitution (C.O.R) and compression of resultant molded cores are set forth below. The data for these examples are the averages for twelve cores which were produced for each example. The properties of the molded cores produced from each formulation were measured according to the following parameters:

Riehle compression is a measurement of the deformation of a golf ball in inches under a fixed static load of 225 pounds.

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

TABLE 1

| Example Core Formulations | | | | | |
|---|---|---|---|---|---|
| | Formulations: | | | | |
| Ingredients: | 1 | 2 | 3 | 4 | 5 |
| BR-1220[1] (polybutadiene) | 500 | 500 | 500 | 500 | 500 |
| RR-ZDA (zinc diacrylate) | 168 | 168 | 168 | 168 | 168 |
| Kadox 911[2] | 46 | 46 | 46 | 46 | 46 |
| Verflake | 60 | — | — | — | — |
| Regrind (filler) | 100 | 100 | 100 | 100 | 100 |
| Zinc Stearate | 100 | 100 | 100 | 100 | 100 |
| 231 XL[3] | 4.5 | 4.5 | 4.5 | 4.5 | 4.5 |
| Papi 94[4] | 2.0 | 2.0 | 2.0 | 2.0 | 2.0 |
| Imsil A-8 | — | 60 | — | — | — |
| Imsil A-75 | — | — | 60 | — | — |

TABLE 1-continued

Example Core Formulations

| Ingredients: | 1 | 2 | 3 | 4 | 5 |
|---|---|---|---|---|---|
| Nytal 200 | — | — | — | 60 | — |
| Vantalc 6H | — | — | — | — | 60 |
| Properties of Molded Cores | | | | | |
| Weight, gms | 36.8 | 36.8 | 36.7 | 36.9 | 36.7 |
| Riehle Compression | 59 | 57 | 59 | 57 | 57 |
| C.O.R. (e) | .815 | .817 | .814 | .813 | .792 |

[1] BR-1220 is a polybutadiene manufactured and sold by Shell Chemical Co., Houston, Texas.
[2] Kadox 911 is a zinc oxide.
[3] 231 XL is a peroxyketal sold by Atochem, Lucidol Division, Buffalo, New York.
[4] Papi 94 is a polymeric diisocynate available from Dow Chemical Co., Midland, Michigan.

TABLE 2

Example Core Formulations

| Ingredients: | 6 | 7 | 8 | 9 |
|---|---|---|---|---|
| BR-1220 | 500 | 500 | 500 | 500 |
| RR ZDA | 155 | 155 | 155 | 155 |
| ZnO | 32.5 | 32.5 | 32.5 | 32.5 |
| Zinc Stearate | 100 | 100 | 100 | 100 |
| Limestone | 92.5 | — | — | — |
| Imsil A-75 | — | 92.5 | — | — |
| NYTAL 200 | — | — | 92.5 | — |
| Ground Flash | 100 | 100 | 100 | 100 |
| 231 XL | 4.5 | 4.5 | 4.5 | 4.5 |
| Papi 94 | 2.5 | 2.5 | 2.5 | 2.5 |
| Verflake | — | — | — | 92.5 |
| Properties of Molded Cores | | | | |
| Weight, gms | 37.1 | 37.2 | 37.1 | 37.0 |
| Riehle Compression | 60 | 58 | 59 | 60 |
| C.O.R.(e) | .803 | .810 | .804 | .806 |

TABLE 3

Example Core Formulations

| Ingredients: | 10 | 11 | 12 | 13 | 14 | 15 |
|---|---|---|---|---|---|---|
| BR-1220 | 500 | 500 | 500 | 500 | 500 | 500 |
| RR ZDA | 168 | 168 | 168 | 168 | 168 | 168 |
| Kadoz 911 | 46 | 46 | 46 | 46 | 46 | 46 |
| Verflake | 60 | 30 | 30 | — | — | 60 |
| Regrind | 100 | 100 | 100 | 100 | 100 | 100 |
| Zn Stearate | 100 | 100 | 100 | 100 | 100 | — |
| 231 XL | 4.5 | 4.5 | 4.5 | 4.5 | 4.5 | 4.5 |
| Papi 94 | 2.0 | 2.0 | 2.0 | 2.0 | 2.0 | 2.0 |
| Imsil A-8 | — | 30 | — | 60 | — | — |
| Imsil A-75 | — | — | 30 | — | 60 | — |
| RR Zn Stearate | — | — | — | — | — | 100 |
| Molded Core Properties: | | | | | | |
| Weight, gms | 36.7 | 36.7 | 36.8 | 36.7 | 37.7 | 36.8 |
| Coefficient (C.O.R.) | .810 | .812 | .812 | .813 | .813 | .808 |
| Riehle Compression | 62 | 61 | 59 | 61 | 60 | 61 |

TABLE 4

Example Core Formulations

| Ingredients: | 16 | 17 | 18 | 19 | 20 |
|---|---|---|---|---|---|
| BR-1220 | 500 | 500 | 500 | 500 | 500 |
| RR ZDA | 155 | 155 | 155 | 155 | 155 |
| ZnO | 32.5 | 32.5 | 32.5 | 32.5 | 32.5 |
| Zn Stearate | 100 | 100 | 100 | 100 | 100 |
| Limestone | 92.5 | — | — | — | — |
| Imsil A-75 | — | 92.5 | — | — | — |
| Smith Chem. Silica | — | — | 92.5 | — | — |
| U.S. Silica #200 | — | — | — | 92.5 | — |
| Ground Flesh | 100 | 100 | 100 | 100 | 100 |
| 231 XL | 4.5 | 4.5 | 4.5 | 4.5 | 4.5 |
| Papi 94 | 2.5 | 2.5 | 2.5 | 2.5 | 2.5 |
| Molded Core Properties: | | | | | |
| Weight, gms | 36.5 | 36.5 | 36.5 | 36.5 | 37.5 |
| Coefficient (C.O.R.) Compression | .802 | .806 | .803 | .800 | .802 |

TABLE 5

Example Core Formulation

| Ingredients: | 21 | 22 | 23 | 24 | 25 |
|---|---|---|---|---|---|
| BR-1220 | 500 | 500 | 500 | 500 | 500 |
| RR ZDA | 155 | 155 | 155 | 155 | 155 |
| ZnO | 32.5 | 32.5 | 32.5 | 32.5 | 32.5 |
| Zn Stearate | 100 | 100 | 100 | 100 | 100 |
| Limestone | 92.5 | — | — | — | — |
| Imsil A-75 | — | 92.5 | — | — | — |
| Smith Chem. Silica | — | — | 92.5 | — | — |
| 201 Silica | — | — | — | 92.5 | — |
| Ground Flesh | 100 | 100 | 100 | 100 | 100 |
| 231 XL | 4.5 | 4.5 | 4.5 | 4.5 | 4.5 |
| Verflake | — | — | — | — | 92.5 |
| Molded Core Properties: | | | | | |
| Weight, gms | 37.0 | 37.0 | 36.9 | 36.9 | 36.9 |
| C.O.R. (e) | .797 | .801 | .798 | .800 | .799 |
| Riehle Compression | 60 | 59 | 59 | 60 | 61 |

TABLE 6

Example Core Formulations

| Ingredients: | 26 | 27 | 28 | 29 |
|---|---|---|---|---|
| BR-1220 | 500 | 500 | 500 | 500 |
| RR ZDA | 155 | 155 | 168 | 168 |
| Kadox 911 | 32.5 | 32.5 | 46 | 46 |
| Verflake | — | — | 60 | — |
| Limestone | 92.5 | — | — | — |
| Regrind | 100 | 100 | 100 | 100 |
| Zn Stearate | 100 | 100 | 100 | 100 |
| 231 XL | 4.5 | 4.5 | 4.5 | 4.5 |
| Tamsil 150 | — | 92.5 | — | 60 |
| Molded Core Properties: | | | | |
| Weight, gms | 36.8 | 36.7 | 36.3 | 36.5 |
| C.O.R. | .797 | .802 | .806 | .805 |
| Riehle Compression | 62 | 61 | 63 | 62 |

TABLE 7

Example Core Formulations:

| Ingredients: | 30 | 31 | 32 | 33 | 34 | 35 |
|---|---|---|---|---|---|---|
| BR-1220 | 500 | 500 | 500 | 500 | 500 | 500 |
| RR ZDA | 155 | 155 | 155 | 168 | 168 | 168 |
| Kadox 911 | 32.5 | 32.5 | 32.5 | 46 | 46 | 46 |
| Verflake | — | — | — | 60 | — | — |
| Limestone | 92.5 | — | — | — | — | — |
| Regrind | 100 | 100 | 100 | 100 | 100 | 100 |
| Zn Stearate | 100 | 100 | 100 | 100 | 100 | 100 |
| 231 XL | 4.5 | 4.5 | 4.5 | 4.5 | 4.5 | 4.5 |
| Micro-Cel E | — | 92.5 | — | — | 60 | — |
| H/A 80-20 | — | — | 92.5 | — | — | 60 |

TABLE 7-continued

Example Core Formulations:

| Ingredients: | 30 | 31 | 32 | 33 | 34 | 35 |
|---|---|---|---|---|---|---|
| Molded Center Properties: | | | | | | |
| Weight, gms | 36.9 | 36.4 | 36.4 | 36.7 | 36.5 | 36.5 |
| Coefficient (C.O.R.) | .801 | .760 | .766 | .811 | .782 | .781 |
| Riehle Compression | 65 | 71 | 69 | 62 | 65 | 63 |

TABLE 8

Example Core Formulations:

| Ingredients: | 36 | 37 | 38 | 39 |
|---|---|---|---|---|
| BR-1220 | 500 | 500 | 500 | 500 |
| RR ZDA | 155 | 155 | 168 | 168 |
| Kadox 911 | 32.5 | 32.5 | 46 | 46 |
| Verflake | — | — | 60 | — |
| Limestone | 92.5 | — | — | — |
| Regrind | 100 | 100 | 100 | 100 |
| Zn Stearate | 100 | 100 | 100 | 100 |
| 231 XL | 4.5 | 4.5 | 4.5 | 4.5 |
| Pilot SF 4 | — | 92.5 | — | 60 |
| Molded Center Properties: | | | | |
| Weight, gms | 36.8 | 36.7 | 36.6 | 36.5 |
| Coefficient (C.O.R.) | .796 | .796 | .808 | .804 |
| Riehle Compression | 63 | 63 | 61 | 62 |

TABLE 9

Example Core Formulations:

| Ingredients: | 40 | 41 | 42 | 43 |
|---|---|---|---|---|
| BR-1220 | 500 | 500 | 500 | 500 |
| RR ZDA | 155 | 155 | 168 | 168 |
| Kadox 911 | 32.5 | 32.5 | 46 | 46 |
| Verflake | — | — | 60 | — |
| Limestone | 92.5 | — | — | — |
| Regrind | 100 | 100 | 100 | 100 |
| Zn Stearate | 100 | 100 | 100 | 100 |
| 231 XL | 4.5 | 4.5 | 4.5 | 4.5 |
| Camel-Fil | — | 92.5 | — | 60 |
| Molded Center Properties: | | | | |
| Weight, gms | 36.8 | 36.6 | 36.5 | 36.6 |
| Coefficient (C.O.R.) | .798 | .798 | .808 | .807 |
| Riehle Compression | 64 | 64 | 62 | 62 |

Discussion of the Examples

As it can be seen from the foregoing Tables, the inclusion of the naturally occurring crystalline silicas, particularly the naturally occurring microcrystalline silica particles, to polybutadiene core compositions has the effect of increasing the coefficient of restitution (C.O.R.) of the resultant molded cores. These results are substantially different from those produced by the addition of non-crystalline or amorphorous silica fillers, or the addition of fillers having a $SiO_2$ content of less than 95 percent, wherein decreases in C.O.R. values are generally observed.

Specifically, the results set forth in Table 1 demonstrate that the use of the naturally occurring, microcrystalline silica particles (i.e. "Imsil A-8", median particle size of 2.1 microns) as a replacement for the "Verflake" calcium carbonate filler in top-grade polybutadiene core compositions produces a substantial increase in the coefficient of restitution of the resultant molded cores (and thus improved the travel distance) versus the "Verflake"and/or the two talc (hydrous magnesium silicate) fillers, i.e. "Nytal 200" and "Vantalc 6H" available from R. T. Vanderbilt Company, Inc. of Norwalk, Conn. Along this line, an increase of 3 points in the coefficient of restitution of the resultant molded core (see, for example, Formulation No. 2) results in an increase of approximately 3 to 6 feet in total distance over which a finished ball will travel.

In the formulations set forth in Table 1, Formulation No. 1, containing the "Verflake" calcium carbonate filler, is representative of the top-grade golf ball cores utilized in the current Spalding Top-Flite ® balls. As more clearly observed when comparing the results of Table 1 concerning representative top-grade golf ball core compositions with the results of Table 2 concerning representative low-grade golf ball core compositions, the various grades of core compositions differ due to the incorporation of either calcium carbonate filler (top grade) or limestone (low grade), the amount of zinc diacrylate and zinc oxide utilized, etc.

Moreover, the chemical analysis and typical physical properties of the hydrous magnesium silicate fillers utilized for comparison purposes in Table 1 (see Formulation Nos. 4 and 5) are set forth below:

| VANTALC ® 6H | |
|---|---|
| Typical Chemical Analysis: | |
| (calculated as oxides) | |
| Magnesium oxide (MgO) | 31.3% |
| Silicon Dioxide ($SiO_2$) - by difference | 61.6 |
| Calcium Oxide (CaO) | 0.4 |
| Aluminum Oxide ($Al_2O_3$) | 0.1 |
| Ferric Oxide ($Fe_2O_3$) | 1.3 |
| Loss on Ignition | 5.3 |
| Typical Properties: | |
| Density at 25° C. ($Mg/m^3$) | 2.75 |
| Weight (lbs./solid gallon) | 22.91 |
| pH (ASTM D 1208) | 9.5 |
| Dry Brightness | 88 |
| Plus 325 Mesh, % | NII |
| Oil Absorption (ASTM D 281) | 52 |
| Hegman Fineness (3 lbs/gallon) | 6.0 |
| Moisture ($H_2O$) | 0.25 |
| Median Particle Size (microns) - Sedigraph | 2.3 |

| NYTAL ® Talc | |
|---|---|
| Typical Chemical Analysis (calculated as oxides) | |
| Silicon dioxide ($SiO_2$) | 56.0% |
| Magnesium oxide (MgO) | 30.7 |
| Iron oxide ($Fe_2O_3$) | 0.1 |
| Calcium oxide (CaO) | 7.0 |
| Aluminum oxide ($Al_2O_3$) | 0.3 |
| Ignition loss | 5.6 |
| Screen Specification (percent retained): | |

-continued

| | NYTAL ® Talc | | | |
|---|---|---|---|---|
| | NYTAL 100 2.0 to 3.0 (+200M) | NYTAL 200 1.6 (+325M) | NYTAL 300 0.04 (+325M) | NYTAL 400 trace (+325M) |
| Typical Physical Properties: | | | | |
| Processing method | continuous tube mills | continuous tube mills | air mills | air mills |
| Cumulative screen analysis | | | | |
| +50 mesh | trace | trace | — | — |
| +100 mesh | 0.2 | trace | — | — |
| +200 mesh | 3.0 | 0.1 | trace | — |
| +325 mesh | 10.0 | 1.6 | 0.04 | trace |
| −325 mesh | 90.0 | 98.4 | 99.96 | 99+ |
| Fluffed bulk (#/cu. ft.) | 29 | 27 | 19 | 12 |
| Compacted bulk (#/cu. ft.) | 61 | 60 | 41 | 25 |
| Oil absorption (ASTM D281) | 21 | 23 | 29 | 39 |
| Water absorption | 37 | 37 | 44 | 50 |
| pH at 10% solids | 9.4 | 9.5 | 9.5 | 9.5 |
| Moisture content (%) | 0.5 | 0.5 | 0.5 | 0.5 |
| Photovolt color | 86 | 87 | 89 | 89 |

The data set forth in Table 2 shows that use of the naturally occurring, microcrystalline silicas (i.e. "Imsil A-75", median particle size of 6.2 microns) as a replacement for the limestone filler (a mixture of 95–99 weight percent calcium carbonate and 1–5 weight percent magnesium carbonate) in low-grade polybutadiene core compositions produces a substantial increase in C.O.R. values (i.e. travel distance) versus limestone, "Verflake", and "Nytal 200". In addition, a decrease in compression is also observed through the use of the naturally occurring, microcrystalline silicas. Although the formulations set forth in Table 2 represent low cost recipes and, therefore do not approach maximum initial velocity), the formulations indicate that the relatively low costing naturally occurring, essentially non-reinforcing, micro-crystalline silicas can be utilized for producing low costing cores without detracting, and even enhancing, the core's properties, particularly the core's C.O.R. value.

Similarly, Table 3 demonstrates the effectiveness of the naturally occurring, microcrystalline silica fillers in a slightly modified top-grade polybutadiene core formulation as a partial or whole replacement for "Verflake". The results demonstrated that the naturally occurring, microcrystalline silica fillers utilized in the present invention produce a significant increase in the core's C.O.R. value. Furthermore, in many instances, a decrease in compression is also observed.

The above results indicate that the addition of about 1 to about 30 parts per hundred rubber (pphr), more preferably from about 6 to about 20 pphr (i.e. from about 30 to about 100 parts per five hundred rubber) of the naturally occurring, crystalline silicas (particularly the microcrystalline silicas) in polybutadiene core formulations enhances the molded core's coefficient of restitution. The enhanced C.O.R. values produced by the addition of the naturally occurring crystalline silicas was observed in both low grade and top grade core formulations.

The data set forth in Tables 4 and 5 demonstrate the superiority of the microcrystalline filler materials (i.e. "Imsil A-75") in polybutadiene core compositions over a number of other crystalline silica fillers (i.e. Smith Chemical Silica, U.S. Silica #200, 201 Silica, While the other crystalline silica fillers produced similar or enhanced C.O.R. properties than the currently utilized limestone or "Verflake" fillers, the microcrystalline fillers produced substantially improved properties. Consequently, the naturally occurring microcrystalline silicas are the preferred crystalline silica filler materials utilized in the present invention.

In Table 6, a naturally occurring microcrystalline silica (i.e. "Tamsil 150", median particle size of 15.2 microns) having a much larger particle size than "Imsil A-8" and "Imsil A-75") was substituted for i) limestone filler in the low-grade polybutadiene core compositions; and, ii) the "Verflake" calcium carbonate-filler in the high-grade polybutadiene core composition. While improvements in C.O.R. and compressions were noted in the low-grade polybutadiene core compositions, the much larger particle size, naturally occurring microcrystalline silica, produced only similar or slightly improved C.O.R. and compression characteristics in the high-grade polybutadiene core composition in comparison to the "Verflake". Consequently, while the much larger particle size crystalline silicas are suitable for use in the present invention, the more preferred embodiment is directed to the use of naturally occurring microcrystalline silicas having a median particle size distribution of about 2.0 to about 10 microns.

Table 7 is directed to the valuation of synthetic calcium and magnesium silicates versus the limestone or calcium carbonate fillers currently utilized in the trade. In this regard, "Micro-Cel ®" is the registered trade name of the Celite Corporation of Lompoc, Calif. The "Micro-Cel ®" products comprise of synthetic, hydrous, calcium silicates produced by the hydro-thermal reaction of diatomite, hydrated lime, and water. According to the Celite Corporation, the different grades of "Micro-Cel ®" have the following typical physical and chemical properties:

| Micro-Cel- Typical Physical Properties: | | | | | |
|---|---|---|---|---|---|
| Micro-Cel Grade | A | C | E* | T-38** | T-26* |
| Color | Gray | White | Gray | White | Gray |
| Brightness, Photovolt Blue Filter | 56 | 86 | 58 | 88 | 58 |
| Bulk Density, lbs./cu. ft. | 7.3 | 8.6 | 5.8 | | 5.9 |
| Water Absorption, % By Weight | 450 | 405 | 550 | 370 | 495 |
| Oil Absorption, % By Weight | 380 | 330 | 480 | 320 | 405 |
| 325 Mesh, % Retained | 8.0 | 4.0 | 6.0 | 2.3 | 3.0 |
| pH, 10% Water | 8.5 | 10.0 | 8.4 | 10.0 | 8.4 |

| -continued | | | | | |
|---|---|---|---|---|---|
| Slurry Moisture, % By Weight | 5.8 | 8.0 | 5.5 | 8.0 | 5.5 |
| Surface Area, m²/g (B.E.T.) | 100 | 175 | 120 | 160 | 90 |
| Specific Gravity | 2.6 | 2.4 | 2.6 | 2.4 | 2.6 |
| Refractive Index | 1.55 | 1.55 | 1.55 | 1.55 | 1.55 |

Micro-Cell Typical Chemical Properties:
Chemical Analysis, % by Weight

| Micro-Cel Grade | Total* Ignition Loss | $SiO_2$ | CaO | $Al_2O_3$ | $Fe_2O_3$ | MgO | NaO + $K_2O$ |
|---|---|---|---|---|---|---|---|
| Micro-Cel A | 10.7 | 54 | 32 | 1.6 | .5 | .3 | .7 |
| Micro-Cel C | 18 | 50 | 27 | 1.8 | .6 | .5 | 1.3 |
| Micro-Cel E | 13 | 47 | 32 | 2.5 | .7 | .6 | 1.2 |
| Micro-Cel T-38 | 18 | 50 | 27 | 1.8 | .6 | .5 | 1.3 |
| Micro-Cel T-26 | 13 | 47 | 33 | 2.5 | .7 | .6 | 1.2 |

*Contains less than 0.1% crystalline silica.
**Primarily used as $TiO_2$ extender in latex flat wall paints.
Hegman Fineness -2, Bulking value lb/gal - 18.8, Gal/lb - 0.053.

Moreover, according to the Celite Corporation, "Micro-Cel H/A"80-20 is a relatively new synthetic product that reportedly provides all of the properties of "Micro-Cel E CSF" plus ultra-high absorption. Apparently, one hundred pounds of "Micro-Cell 80/20" can absorb up to 400 pounds of liquid and still remain a free-flowing powder.

The data set forth in Table 7 clearly indicates that the addition of the "Micro-Cel" synthetic silicates to the polybutadiene core compositions produces substantial reductions in resilience values in comparison to the use of the limestone and calcium carbonate (i.e. "Verflake") fillers utilized in the trade as filler components in golf ball core compositions. Consequently, use of amorphous or synthetic silicates is generally undesirable.

Furthermore, the data set forth in Tables 8 and 9 indicates that natural, fine ground, calcium carbonate products, such as those provided by the Oyster Shell Products of Mobile, Ala., under the designation "Pilot SF4" (97.5% $CaCO_3$) and the Genstar Store Products Company of Hunt Valley, Md. under the designation "Camel-Fill", produce, when utilized as filler agents in polybutadiene compositions, similar or a slight decrease in resilience and compression properties in comparison to the limestone and the calcium carbonate products sold by Omya, Inc. of Procter, Vt. under the designation "Verflake" and/or "Omyacarb ®5". Thus, these filler materials are generally less desirable than the current limestone and calcium carbonate fillers used in the trade, and far less desirable than the naturally occurring crystalline (preferably microcrystalline) silica particles of the present invention.

As can be seen from the above information, molded golf ball cores produced in accordance with the present invention exhibit improved coefficient of restitution characteristics without sacrificing cost and/or durability. As a result, the present invention represents a significant discovery in the field of ball manufacturing.

The invention has been described with reference to the preferred embodiments. Obviously, modifications and alterations will occur to others upon reading and understanding the preceding detailed description. It is intended that the invention be construed as including all such alterations and modifications insofar as they come within the scope of the claims and the equivalents thereof.

Having thus described the preferred embodiment, the invention is now claimed to be:

1. An improved core composition for a golf ball exhibiting a high coefficient of restitution, said composition comprising a base elastomer selected from polybutadiene and mixtures of polybutadiene with other elastomers, said polybutadiene having a molecular weight of from about 50,000 to about 500,000, at least one metallic salt of an α, β-ethylenically unsaturated monocarboxylic acid, a free radical initiator, and a crystalline silica.

2. The composition as defined in claim 1, wherein said crystalline silica is a naturally occurring microcrystalline silica.

3. The composition as defined in claim 1, wherein said crystalline silicon has a silicon dioxide content of greater than 95 weight percent and a median particle size from about 2 to about 18 microns.

4. The composition as defined in claim 1, wherein said elastomer is cis-polybutadiene.

5. The composition as defined in claim 1, wherein said metallic salt is selected from the group consisting of acrylic acid, methacrylic acid, itaconic acid, crotonic acid, sorbic acid, and mixtures thereof.

6. The composition as defined in claim 1, wherein said free radical initiator is selected from the group consisting of peroxides, persulfates, hydrazines, and azo compounds.

7. The composition as defined in claim 6, wherein said initiator is a peroxide.

8. The composition as defined by claim 1, further comprising a modifying ingredient selected from fillers, fatty acids, metal oxides, and mixtures thereof.

9. In a core composition for a golf ball comprising a base elastomer selected from polybutadiene and mixtures of polybutadiene with other elastomers, at least one metallic salt of an α, β-ethylenically unsaturated monocarboxylic acid, and a free radical initiator, the improvement comprises adding to the core composition a naturally occurring crystalline silica particle to thereby produce a golf ball exhibiting a high coefficient of restitution.

10. The improved composition of claim 9, wherein said naturally occurring crystalline silica is a microcrystalline silica.

11. The improved composition of claim 9, wherein said naturally occurring crystalline silica has a silicon dioxide content of greater than 95 weight percent and a median particle size from about 2 to about 18 microns.

12. A golf ball exhibiting a high coefficient of restitution, said golf ball comprising a molded, spherical core and a cover thereof, said core comprising a base elastomer selected from polybutadiene and mixtures of polybutadiene with other elastomers, said polybutadiene having a molecular weight from about 50,000 to about 500,000, at least one metallic salt of an α, β-ethylenically unsaturated monocarboxylic acid, a free radical initiator, and a microcrystalline silica.

13. The golf ball as defined in claim 12, wherein said microcrystalline silica has a silicon dioxide content of greater than 95 weight percent.

14. The golf ball as defined in claim 12, wherein said microcrystalline silica has a silicon dioxide content of greater than 95 weight percent and a median particle size from about 2 to about 6.2 microns.

15. The golf ball as defined in claim 12, wherein said elastomer is cis-polybutadiene.

16. The golf ball as defined in claim 12, wherein said metallic salt is selected from the group consisting of acrylic acid, methacrylic acid, itaconic acid, crotonic acid, sorbic acid, and mixtures thereof.

17. The golf ball as defined in claim 12, wherein said free radical initiator is selected from the group consisting of peroxides, persulfates, hydrazines, and azo compounds.

18. The golf ball as defined in claim 12, wherein said initiator is a peroxide.

19. The golf ball as defined by claim 12, further comprising a modifying ingredient selected from additional fillers, fatty acids, metal oxides, and mixtures thereof.

20. The golf ball as defined by claim 12, wherein said cover comprises an ionic copolymer of ethylene and an α, β-ethylenically unsaturated monocarboxylic acid selected from the group consisting of acrylic and methacrylic acid wherein from about 20 to about 90% of the carboxylic acid groups are neutralized by a metal ion.

21. In a core composition for a golf ball comprising a base elastomer selected from polybutadiene and mixtures of polybutadiene with other elastomers, from about 20 to about 50 parts per weight elastomer of at least one metallic salt of an unsaturated carboxylic acid, and from about 1 to about 10 parts per weight elastomer of a free radical initiator, the improvement comprises adding to the core composition from about 6 to about 20 parts per weight elastomer of microcrystalline silica particles to thereby produce a golf ball exhibiting enhanced resilience.

22. The improved composition of claim 21, wherein said microcrystalline silica particles have a silicon dioxide content of greater than 95 weight percent.

23. The improved composition of claim 21, wherein said microcrystalline silica particles have a median particle size from about 2 to about 18 microns.

24. A golf ball using a core and a cover, wherein said core comprises of microcrystalline silica particles dispersed throughout a molded polybutadiene composition.

25. The golf ball of claim 24, wherein said microcrystalline silica particles have a silicon dioxide content of greater than 95 weight percent and a median particle size from about 2 to about 18 microns.

26. A process of increasing the resilience of a golf ball having a core and a cover, said process comprising the steps of:
   a) providing a polybutadiene core composition;
   b) adding to said core composition microcrystalline silica particles;
   c) curing said core composition containing the microcrystalline silica particles; and
   d) covering said cured core composition with a cover.

27. The process of claim 26 wherein said microcrystalline silica particles are microcrystalline silica particles having a silicon dioxide content greater than 95 weight percent and a median particle size from about 2 to about 18 microns.

* * * * *